Nov. 15, 1932.    W. W. HOOPER    1,888,129
MOTOR VEHICLE AXLE
Filed Sept. 10, 1930    2 Sheets-Sheet 1

INVENTOR.
W.W. HOOPER.
BY
Victor J. Evans
ATTORNEY.

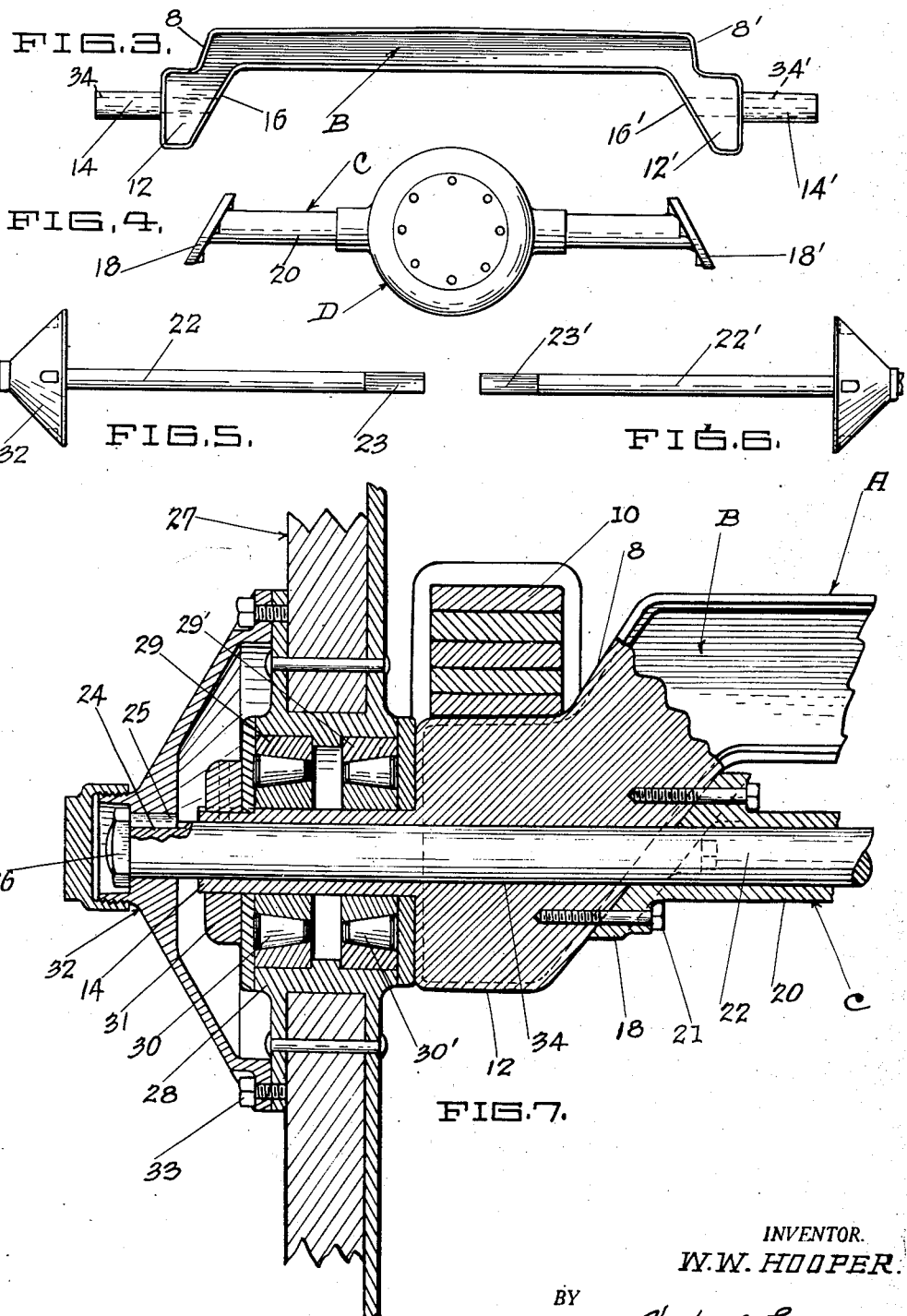

Patented Nov. 15, 1932

1,888,129

UNITED STATES PATENT OFFICE

WARD W. HOOPER, OF HOLLISTER, CALIFORNIA

MOTOR VEHICLE AXLE

Application filed September 10, 1930. Serial No. 481,062.

This invention relates broadly to improvements in motor vehicle axles, but more particularly to a rear axle and differential combination arranged and constructed in such a manner that it may be readily assembled and dismantled without the necessity of jacking up the axle or taking the load off the wheels of the vehicle.

The construction shown is most suitable for heavy duty vehicles, although it may be utilized to advantage in the ordinary motor-vehicle by reducing the size and weight of the axle accordingly.

The principal object of the invention is to provide a rear axle of the class indicated that embodies a full floating driving axle or sub-axle and a master load supported axle arranged and combined in such a manner that the master axle carries the full load of the vehicle, thus relieving the driving axle of all load strains.

A further object of the invention is to provide an axle of the character described that embodies a removable sub-axle and differential housing combination, the driving shafts thereof being readily removable from the sub-axle housing for repairs or other purposes without in any way affecting the driving wheels or taking the load of the vehicle from these wheels.

A further object of the invention is to provide a motor vehicle axle that is rigid and strong in construction and that may be quickly and easily assembled or dismantled.

Other objects and advantages will be apparent during the course of the following description.

Figure 1:
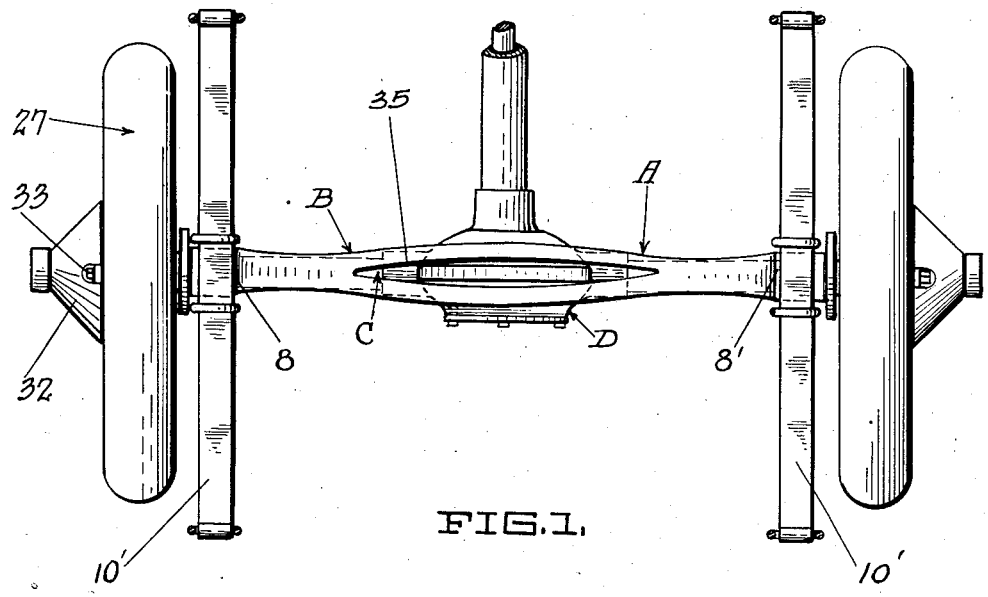
Figure 2:
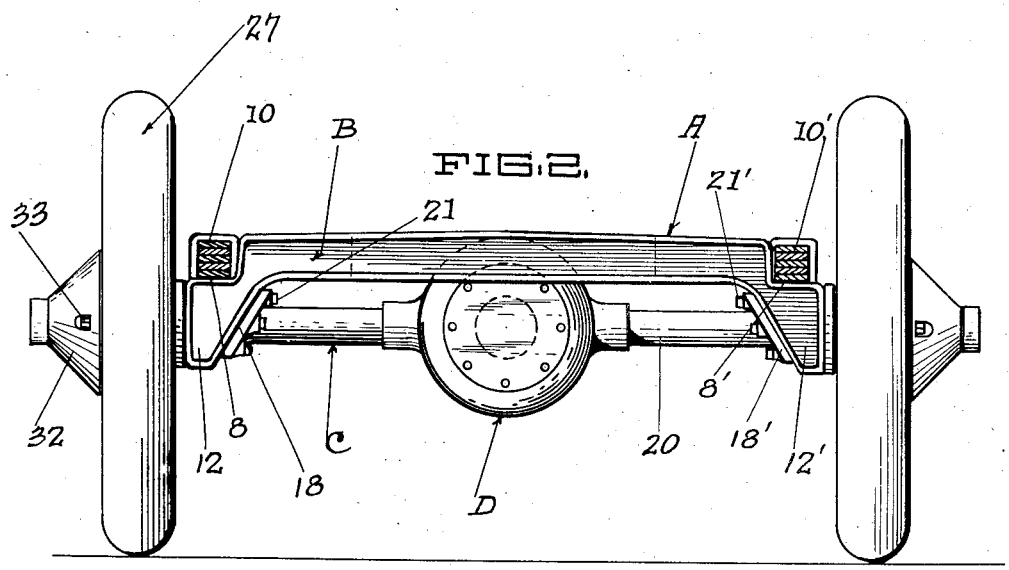

In the accompanying drawings forming a part of this specification and in which like numerals are employed to designate like parts throughout the same, Figure 1 is a plan view illustrating a rear-axle constructed in accordance with the principles of the invention, Figure 2 is a rear end elevation of the axle showing the construction and arrangement of the various elements constituting the combination, Figure 3 is an elevation illustrating the master or load supporting axle, per se, Figure 4 is an elevation illustrating the sub-axle housing and differential gear housing per se, Figure 5 is a detail of the left-hand driving axle and fixedly secured driving cone which is bolted to the hub of the driving wheel, Figure 6 is a detail of the right-hand driving shaft, and Figure 7 is an enlarged sectional detail taken thru one wheel hub and showing the method of attachment of the wheel to the driving axle and the arrangement of the various parts constituting the combination of elements of the device.

Referring more particularly to the drawings in which the preferred form of the invention is illustrated, the axle in general is indicated by the latter A, and embodies the master supporting axle B, sub-axle C and the differential housing D.

The master or load supporting axle B is of the usual forged I-beam type and consists of shoulders 8 and 8' on which are mounted the usual body supporting springs 10 and 10', and downwardly extending end sections 12 and 12', said end sections bearing the integrally formed and outwardly projecting hollow wheel supporting spindles 14 and 14', as clearly indicated in Figures 3 and 7.

The inner faces 16 and 16' of the sections 12 and 12' of the supporting axle are beveled in opposite directions, as indicated, and these faces are machine finished to accommodate the angularly disposed fittings 18 and 18' integrally formed on opposite ends of the sub-axle housing 20, said axle being secured in place by means of cap screws 21 and 21' as indicated in Figures 2 and 7.

The driving shafts 22 and 22', Figures 5, 6 and 7, are of the usual form and are provided at their inner ends with squared sections 23 and 23' adapted to be inserted into corresponding openings provided in the differential gearing (not shown). The outer ends of said shafts are provided with a keyway 24 adapted to receive a key 25 and a nut 26, clearly indicated in Figure 7.

As both axle housings and driving cones are identical in form, one side only will be described in detail, this detail being clearly shown in Figure 7, and embodying the usual wheel 27, hub 28, roller bearing cones 29 and 29' and roller bearings 30 and 30', held in place by suitable adjusting member or collar 31 which is splined to the tubular spindle 14 and is adjustable thereon.

The axle B, wheel supporting shaft 14, and sub-axle housing 20, when assembled, provide a perfectly aligned bore for the driving axle 22 and the outer end of this axle is provided with a driving cone 32, keyed to the shaft at 25, and in turn securely bolted to the wheel hub by a plurality of cap screws 33.

The shafts 22 and 22' turn freely in their respective bores 34 and 34' and the load including that of the vehicle is carried by the master axle B, and its tubular spindles 14 and 14'. In this manner the load is borne entirely by the master axle and the driving shafts 22 and 22' are free of any load whatever, and, in the event that either shaft is broken it may be withdrawn from the housing 20 by releasing the cone 32 from the wheel hub by removing the cap screws 33.

In the event that it is desired to dismantle the rear axle it is only necessary to release both cones and withdraw the driving shafts 22 and 22' from the sub-axle housing 20. The sub-axle and differential gear housing D may then be readily detached from the master supporting axle B without affecting the function of the driving wheels in supporting the load of the vehicle.

It will be noted with reference to Figures 1 and 2 that the master axle B is divided centrally as indicated at 35, the aperture thus formed providing an opening thru which a portion of the differential housing extends to make the axle, in its entirety, as compact as possible.

An axle constructed in accordance with this invention is compact, strong, and durable, and the various parts constituting the same may be quickly and easily assembled and dismantled at will either in the shop or on the road and it is especially adapted for use in the construction of heavy duty vehicles and trucks.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

A motor vehicle axle of the class described comprising, in combination, a master load supporting axle having shouldered end sections, a centrally slotted section and outwardly projecting tubular wheel supporting spindles, the inner faces of said end sections being bevelled, a sub-axle housing positioned below said master axle and having a differential housing extending into the centrally slotted master axle, said sub-axle housing having correspondingly bevelled end sections adapted to be bolted to the master axle, driving shafts extending through said sub-axle housing and said tubular spindles, and hollow cones bolted to the wheels and in turn keyed to the ends of said driving shafts.

In testimony whereof I affix my signature.

WARD W. HOOPER.